United States Patent [19]

Mao et al.

[11] Patent Number: 6,074,776
[45] Date of Patent: Jun. 13, 2000

[54] POLYMERIZABLE ADDITIVES FOR MAKING NON-AQUEOUS RECHARGEABLE LITHIUM BATTERIES SAFE AFTER OVERCHARGE

[75] Inventors: Huanyu Mao, Maple Ridge; David Stanley Wainwright, Vancouver, both of Canada

[73] Assignee: E-One Moli Energy (Canada) Limited, Maple Ridge, Canada

[21] Appl. No.: 09/006,015

[22] Filed: Jan. 12, 1998

[30] Foreign Application Priority Data

May 16, 1997 [CA] Canada .................................... 2205683

[51] Int. Cl.$^7$ .............................. H01M 2/00; H01M 10/08
[52] U.S. Cl. ................................ 429/61; 429/62; 429/57; 429/324; 429/327; 429/328
[58] Field of Search ...................... 429/324, 327, 429/328, 57, 61, 62, 185

[56] References Cited

U.S. PATENT DOCUMENTS

| | | | |
|---|---|---|---|
| 5,609,974 | 3/1997 | Sun | 429/192 |
| 5,776,627 | 7/1998 | Mao et al. | 429/61 |
| 5,879,834 | 3/1999 | Mao | 429/197 |
| 5,891,592 | 4/1999 | Mao et al. | 429/197 |

*Primary Examiner*—Maria Nuzzolillo
*Assistant Examiner*—Tracy Dove
*Attorney, Agent, or Firm*—Synnestvedt & Lechner LLP

[57] ABSTRACT

After undergoing overcharge abuse, non-aqueous rechargeable lithium batteries can be left in a relatively hazardous state of charge, representing a safety concern with respect to subsequent thermal or mechanical abuse. Electrolyte additives which electrochemically form conductive polymers can be used to create a short circuit inside the battery as a result of overcharge abuse and automatically discharge the battery internally. The invention is particularly suitable for batteries equipped with electrical disconnect devices which cannot be discharged externally after the disconnect has activated. Aromatic compounds such as biphenyl are particularly suitable additives.

28 Claims, 1 Drawing Sheet

POLYMERIZABLE ADDITIVES FOR MAKING NON-AQUEOUS RECHARGEABLE LITHIUM BATTERIES SAFE AFTER OVERCHARGE

FIELD OF THE INVENTION

This invention pertains to non-aqueous rechargeable lithium batteries and to methods for improving the safety thereof. It particularly pertains to the use of polymerizable monomer additives as means for rendering lithium ion batteries safe to further abuse after the batteries have been overcharged.

BACKGROUND OF THE INVENTION

The demand for rechargeable batteries having ever greater energy density has resulted in substantial research and development activity in rechargeable lithium batteries. The use of lithium is associated with high energy density, high battery voltage, long shelf life, but also with safety problems (ie. fires), since lithium is a highly reactive element. As a result of these safety problems, many rechargeable lithium battery electrochemistries and/or sizes are unsuitable for use by the public. In general, batteries with electrochemistries employing pure lithium metal or lithium alloy anodes are only available to the public in very small sizes (eg. coin cell size) or are primary types (eg. non-rechargeable). However, larger rechargeable batteries having such electrochemistries can serve for military or certain remote power applications where safety concerns are of somewhat lesser importance, or the personnel involved are trained to deal with the higher level of hazard.

Recently, a type of rechargeable lithium battery known as lithium-ion or 'rocking chair' has become available commercially and represents a preferred rechargeable power source for many consumer electronics applications. These batteries have the greatest energy density (Wh/L) of presently available conventional rechargeable battery systems (ie. NiCd, NiMH, or lead acid batteries). Additionally, the operating voltage of lithium ion batteries is often sufficiently high that a single cell can suffice for many electronics applications.

Lithium ion batteries use two different insertion compounds for the active cathode and anode materials. 3.6 V (average) lithium ion batteries based on $LiCoO_2$/pre-graphitic carbon electrochemistry are now commercially available. Many other lithium transition metal oxide compounds are suitable for use as the cathode material, including $LiNiO_2$ and $LiMn_2O_4$. Also, a wide range of carbonaceous compounds is suitable for use as the anode material, including coke and pure graphite. The aforementioned products employ non-aqueous electrolytes comprising $LiBF_4$ or $LiPF_6$ salts and solvent mixtures of ethylene carbonate, propylene carbonate, diethyl carbonate, ethyl methyl carbonate, and the like. Again, numerous options for the choice of salts and/or solvents in such batteries are known to exist in the art.

Lithium ion batteries can be sensitive to certain types of abuse, particularly overcharge abuse wherein the normal operating voltage is exceeded during recharge. During overcharge, excessive lithium is extracted from the cathode with a corresponding excessive insertion or even plating of lithium at the anode. This can make both electrodes less stable thermally. The anode becomes less stable as it gets doped or plated with reactive lithium while the cathode becomes more prone to decomposing and evolving oxygen (see J. R. Dahn et al., Solid State Ionics, 69(3–4), p265–270, 1994). Overcharging also results in heating of the battery since much of the input energy is dissipated as heat rather than stored. The decrease in thermal stability combined with battery heating can lead to dangerous thermal runaway and fire on overcharge.

Battery chargers and/or battery packs comprising assemblies of individual lithium ion batteries are generally equipped with appropriate electrical circuitry to prevent overcharge. However, in the event of failure of the circuitry, many manufacturers incorporate additional safety devices, in the individual batteries themselves, to provide a greater level of protection against overcharge abuse. For instance, as described in U.S. Pat. No. 4,943,497 and Canadian Patent Application Ser. No. 2,099,657, filed Jun. 25, 1993, published Feb. 11, 1994, respectively, the lithium battery products of Sony Corporation and Moli Energy (1990) Limited incorporate internal disconnect devices which activate when the internal pressure of the battery exceeds a predetermined value during overcharge abuse. Various gassing agents (eg. cathode compounds and/or other battery additives) may be used to generate sufficient gas above a given voltage during overcharge so as to activate the disconnect device.

Another alternative method relies on the net increase in internal solids volume to hydraulically activate a disconnect device at a specified state of overcharge (as disclosed in Canadian Patent Application Ser. No. 2,093,763, filed Apr. 8, 1993, published Oct. 9, 1994).

Other overcharge safety devices may be incorporated in the lithium batteries themselves to limit the charging current and/or voltage. Positive temperature coefficient resistors (PTCs) are incorporated by some manufacturers in part to limit the charging current during overcharge abuse. These devices rely on a combination of heating of the battery and IR heating of the PTC to trigger the PTC, which thereby increases its resistance and limits the charging current. In principle, it is also possible to consider incorporating an electrical circuit for overcharge protection in the headers of the individual batteries themselves.

These additional or backup safety devices can be effective insofar as eliminating hazards associated with the electrical abuse of overcharge. However, the overcharged battery is typically left in a higher state of charge than normal. The contents of the battery can therefore be left in a less than normal thermally stable state, thereby posing more of a hazard than normal. Such overcharged batteries can be more sensitive to subsequent mechanical abuse (eg. being crushed) or thermal abuse (eg. being heated in an oven). While many batteries can simply be discharged manually in the event that overcharge abuse has occurred, thereby placing the battery in a safe discharged state for later disposal, it is preferred that this discharge be done automatically.

Batteries with activated internal electrical disconnect devices however cannot be externally discharged to drain them of energy and lower the state of charge. Such disconnected batteries may be locked into an abnormally unsafe state of charge and pose additional risk with regards to disposal or tampering. Unfortunately, after the activation of a disconnect, such a battery will appear to have no remaining capacity (ie. be completely dead). At this point, an unwary consumer might be more tempted than usual to disassemble or otherwise mechanically abuse the battery with unfortunate consequences as a result. Thus, means for discharging such overcharged batteries automatically and internally are highly desirable.

Several means for automatically discharging batteries are known or have been proposed in the art. Aqueous battery electrochemistries may exhibit recombination reactions at the end of charge which effectively serve to continuously discharge the battery while charging continues. Additives (chemical shuttles) have also been disclosed for non-aqueous battery electrochemistries to serve a similar purpose. Recombination reactions and chemical shuttles may be viewed as automatically discharging the batteries but only such that the normal maximum operating charging voltage is not exceeded.

Means for creating internal short circuits in overcharged batteries are also known in the art. Electrochemical corrosion reactions may be relied on to rapidly corrode metallic hardware or other additives which are maintained at cathode potential (eg. cathode current collector). A corroded species from the cathode can then migrate and plate at the anode resulting in the formation of a conductive dendrite. With continued corrosion and plating, a conductive dendrite bridge can form between the cathode and anode thereby electrically shorting the battery through the dendrite bridge. Often, little actual charge needs to be consumed in corrosion reactions before a dendrite bridge forms. Thus, cathode hardware materials or other additives may be suitable for this purpose if the onset of corrosion occurs above the maximum operating voltage and if significant corrosion occurs before overcharging presents a safety hazard. Many readily available material options exist for low voltage (eg. circa 2 volt) non-aqueous batteries. For instance, in lithium anode/molybdenum disulfide cathode batteries manufactured by Moli Energy Ltd. in the 1980s, stainless steel and/or nickel hardware at cathode potential would corrode, create dendrite bridges, and short circuit the battery internally thereby limiting the state of charge and protecting the batteries during overcharge abuse. However, not so many material options are available for higher voltage (eg. circa 4 volt) non-aqueous batteries. Most commonly available hardware materials corrode at too low a potential to allow for the normal operation of the battery. On the other hand, those speciality materials which do not corrode at too low a potential may not corrode significantly enough when needed for overcharge protection. Thus, neither common nor speciality materials are readily available for higher voltage non-aqueous batteries.

Mechanical means for creating internal short circuits in overcharged batteries have also been considered in the art. For instance, one option proposed is similar to the aforementioned electrical disconnect devices except that instead of effecting a disconnect when activated, a mechanism would instead be incorporated which effected a short circuit connection. This option however is mechanically complex and raises cost and reliability concerns.

Ideally, the means for creating internal short circuits on overcharge would be reliable and inexpensive. Optimally, mild shorts are produced, perhaps progressively or incrementally and perhaps distributed throughout the inside of the battery, such that the power and heat dissipated through the shorts is not suddenly large or localized (ie. creating spot heating). Either of these latter conditions represents a hazard in themselves.

Co-pending Canadian Patent Application Ser. No. 2,163,187, filed Nov. 17, 1995, by a common inventor, discloses the use of polymerizable monomer additives as gassing agents in lithium batteries for purposes of activating internal electrical disconnect devices on overcharge. Therein, it is disclosed that certain monomer gassing agents which form conductive polymer products might provide the additional advantage of creating an internal short and discharging the batteries following overcharge abuse. In the examples, this additional advantage is actually obtained in batteries comprising a biphenyl additive. The polymerization product of the biphenyl is conductive.

Co-pending Canadian Patent Application Ser. No. 2,156.800, filed Aug. 23, 1995 by a common inventor, discloses the use of polymerizable monomer additives for purposes of protecting a rechargeable lithium battery during overcharge. Therein, a small amount of polymerizable additive is mixed in the liquid electrolyte. During overcharge abuse, the aromatic additive polymerizes at voltages greater than the maximum operating voltage of the battery thereby increasing its internal resistance sufficiently for protection.

In the aforementioned co-pending Canadian patent applications Ser. Nos. 2,163,187 and 2,156,800, it is not directly disclosed that it would be advantageous in general to have batteries automatically discharge themselves after overcharge abuse, ie. independent of whether the battery contained an internal disconnect device. Also, it is not directly disclosed that the use of monomer additives which form conductive products when polymerized can be advantageous independent of whether the monomer also serves as a gassing agent or serves to significantly increase the internal resistance of the battery.

Some aromatic compounds which are fundamentally capable of polymerizing electrochemically and forming conductive polymers have been used in electrolyte solvent mixtures and/or as electrolyte solvent additives in certain specific rechargeable non-aqueous lithium batteries for purposes of enhancing cycle life. In Japanese Patent Application Laid-open No. 61-230276, a laboratory test cell employing an electrolyte comprising a furan (an aromatic heterocyclic) solvent additive demonstrated an improved cycling efficiency for plated lithium metal. In Japanese Patent Application Laid-open No. 61-147475, a polyacetylene anode, $TiS_2$ cathode battery employing an electrolyte comprising a thiophene solvent additive showed better cycling characteristics than similar batteries without the additive. No mention is made in these applications about potential safety advantages resulting from the electrochemical polymerization capability of the additives. Also, it is unclear whether the actual embodiments in these applications would possess a safety advantage in practice during overcharge abuse as a result of incorporating the additives (ie. other events that occur during overcharge might prevent polymerization and/or polymerization might not result in the creation of an internal short).

SUMMARY OF THE INVENTION

The invention comprises both methods and embodiments for automatically discharging non-aqueous rechargeable lithium batteries internally after the batteries have been subjected to overcharge abuse. (Overcharge abuse is considered to occur when the battery is charged to a voltage exceeding the normal maximum operating charging voltage.) Monomer additives which form electrically conductive polymer products when polymerized are incorporated into the non-aqueous electrolyte. During overcharge abuse, the monomer additive polymerizes thereby creating an internal short circuit in the battery and discharging it.

The invention can be useful whether or not the batteries need to be individually equipped with additional overcharge protection means. For instance, low rate batteries may not require additional means to ensure that the batteries are safe against electrical overcharge abuse. However, after overcharge, such low rate batteries may still pose a hazard with respect to subsequent thermal abuse. Thus, the invention can be useful in cases where discharging these low rate batteries to a lower state of charge renders them safer to subsequent thermal abuse.

In a like manner, the invention can be useful for batteries equipped with positive temperature coefficient (PTC) resistors or other electrical circuit means to limit charging current or voltage. Such batteries typically can be manually discharged at a controlled rate to render them safer, if necessary. However, in safety matters, it can be preferable to do this automatically and internally to ensure that the discharging is indeed performed. Certain additives of the invention, such as biphenyl, can not only serve to automatically discharge an overcharged PTC equipped battery, but can also serve to assist the PTC during the overcharge by increasing the internal impedance (as disclosed in co-pending Canadian Patent Application Ser. No. 2,156,800 above).

A preferred application of the invention is in rechargeable lithium batteries which comprise an internal electrical disconnect device wherein the disconnect device is activated at a predetermined internal pressure. As in the aforementioned Canadian Patent Application Ser. No. 2,163,187, the monomer additive may serve both as the activating gassing agent and as the monomer which creates the internal short circuit when polymerized. However, the monomer additive of the instant invention need not be a primary source of pressure activating gas, nor in fact a gassing agent at all. For such embodiments, it may instead be desirable to employ other means for activating the electrical disconnect device in combination with the instant monomer additive. Since the internal short circuit can be created by the instant additive after a partial overcharge (ie. overcharge stops before activation of the electrical disconnect device), the overcharged battery can be discharged and rendered safe even if the partial overcharge abuse is not otherwise noticed to have occurred by the activating of the disconnect.

Generally, the non-aqueous rechargeable batteries of the invention comprise a lithium insertion compound cathode, a lithium compound anode (eg. lithium metal, lithium alloy, or lithium insertion compound), and a non-aqueous electrolyte (typically a liquid, but polymer or plasticized polymer electrolytes may also be possible). For lithium ion batteries, the lithium insertion compound cathode can be $Li_xCoO_2$, or alternately can be selected from the group consisting of $Li_xNiO_2$ and $Li_xMn_2O_4$. The lithium compound anode can be a carbonaceous insertion compound. The liquid electrolyte solvent can comprise organic carbonates such as ethylene carbonate, propylene carbonate, diethyl carbonate, and ethyl methyl carbonate. The electrolyte solute can comprise various lithium salts such as $LiPF_6$ or $LiBF_4$. The invention is particularly suitable for batteries whose maximum operating charging voltage is greater than 4 volts.

Batteries of the invention additionally have a monomer additive mixed in the electrolyte wherein the monomer additive polymerizes at battery voltages greater than the maximum operating voltage thereby forming a conductive polymer and creating an internal short circuit in the battery. The amount of monomer additive must be sufficient such that the polymer formed does indeed bridge both cathode and anode thus shorting the battery. Amounts of less than about 5% monomer additive by weight in the mixture of electrolyte and monomer additive can be sufficient.

The monomer additive can be aromatic. Biphenyl is a particularly suitable additive for lithium ion batteries with operating voltages in the 4 volt range. Biphenyl can be effective in amounts of about 2 to 3 % by weight in the electrolyte mixture.

Aromatic heterocyclic compounds can also be suitable as additives. For instance, pyrrole, N-methylpyrrole, and thiophene polymerize and create an internal short in certain batteries. Thus, broadly speaking, these additives are potentially suitable, but appear preferable for use in batteries with maximum operating charging voltages less than about 4 volts. Additives such as furan, indole, and 3-chlorothiophene may be potentially suitable additives for batteries with higher operating charging voltages. The substitution of different chemical groups in these compounds is expected to result in slight modifications to the polymerization potential and/or conductivity of the product polymer. Thus, substituted versions of these compounds may also be suitable and/or preferred.

A method for obtaining the desired results in a given battery embodiment involves selecting a monomer additive that polymerizes to form an electrically conductive polymer at battery voltages greater than the maximum operating charging voltage, and mixing an amount of this monomer in the electrolyte wherein the amount is sufficient such that an internal short circuit is created by the polymerized additive during overcharge abuse thereby automatically discharging the battery to a safe state of charge. Since neither very rapid nor very slow discharge rates are desirable and since the additive may serve no other purpose, the lowest enabling amount of additive may be preferred as long as the internal short circuit created is capable of discharging the battery to a safe state of charge within about 24 hours. (Of course, additives like biphenyl may serve other useful purposes in combination, such as activating disconnect devices or increasing battery impedance as mentioned in the two co-pending Canadian patent applications Ser. Nos. 2,156,800 and 2,163,189 above.)

DETAILED DESCRIPTION OF SPECIFIC EMBODIMENTS OF THE INVENTION

Figure 1:
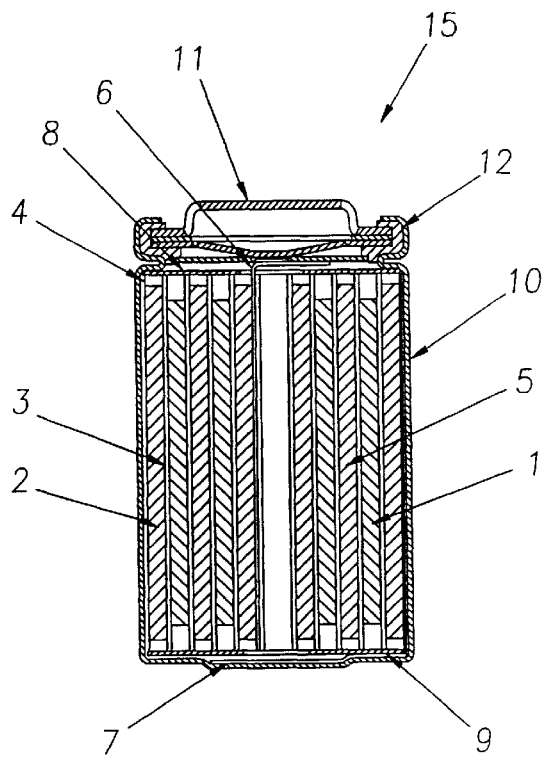
FIG. 1 depicts a cross-sectional view of a preferred embodiment of a cylindrical spiral-wound lithium ion battery.

To minimize accidents, any energy storage device at the end of its useful life is ideally drained of stored energy prior to disposal and certainly prior to any action constituting abuse of the battery. Non-aqueous rechargeable batteries are no exception, particularly those used by the general public. Most non-aqueous electrochemical systems used by the public require protection against excessive charging since such electrical abuse usually results in unwanted reaction products and by-product heat at a time when the battery is fully loaded with energy. While these batteries are adequately protected against overcharge itself, the batteries can constitute a potential hazard if abused again thereafter (known as 'stacked abuse').

It is preferable not to have to rely on the voluntary actions of the public to ensure safety. Battery packs may be disassembled by the public thereby removing external protection devices, and/or individual batteries may be subsequently abused notwithstanding warning notices and well publicized risk in so doing. Inoperative batteries are perhaps more likely to be so casually treated by the public than are batteries with some remaining life. In this regard, the need to rely on the consumer can be desirably bypassed if inoperative batteries would automatically discharge themselves internally at a safe rate after overcharge.

Lithium ion batteries generally become less stable to thermal abuse as the state of charge is increased. The upper voltage limit for certain commercial lithium ion batteries is specified in part for purposes of limiting the battery to a relatively safe state of charge thermally. Such lithium ion batteries in an overcharged state are fundamentally more prone to venting and catching fire than other types of batteries. Thus, lithium ion chargers and/or battery packs are typically equipped with reliable external circuitry to prevent overcharge. However, this external circuitry can be defeated by a determined user and even the most reliable circuitry has a small but finite failure rate. Consequently, internal overcharge protection devices are typically provided in commercial lithium ion batteries. These devices are useful in providing protection even if external circuitry is defeated or has failed.

Preferably, once an internal overcharge protection device has been activated, a lithium ion battery is no longer used. Until it is discharged, the overcharged battery can pose a potential hazard with regards to subsequent thermal or mechanical abuse. Unfortunately, in order to effect a subsequent discharge, it is often necessary to have the user intervene appropriately. In some circumstances, it may not even be possible for the user to discharge the battery externally. This is the case when internal electrical disconnect devices have been activated. A battery with an activated disconnect device appears to the user to be "dead" and cannot be discharged externally.

The instant invention addresses this concern by providing automatic means for discharging a non-aqueous battery internally after the battery has been overcharged. This is accomplished by incorporating a small amount of a suitable polymerizable monomer additive in the non-aqueous electrolyte of the battery. The monomer additive is selected such that it polymerizes at a suitable voltage to form an electrically conductive polymer product. Significant polymerization should not occur during normal operation of the battery (ie. in the normal operating voltage range). However, during overcharge abuse, the polymerizing voltage is attained whereupon the monomer additive starts to polymerize. Eventually, enough conductive polymer is formed to create a conductive bridge between the battery electrodes thereby creating an internal short circuit in the battery and discharging it. Preferably, the conductive bridge forms before the battery ever reaches an undesirable state of charge from a safety perspective. In that way, the battery cannot even be partially overcharged to that undesirable state without initiating an internal discharge.

The monomer additive must therefore meet several requirements simultaneously in order to be effective. It must be capable of polymerizing electrochemically to form an enabling conductive polymeric bridge at a rather specific voltage. Also, the inclusion of the additive must not otherwise adversely affect battery performance. Although many monomers may work in principle, aromatic monomers can be particularly suitable since the polymerization potentials can be in a range that is suitable for this application and the polymerization reactions can produce conductive products. Additionally, aromatic compounds are often compatible with lithium battery chemistries in small amounts.

As discussed in Organic Chemistry by R. J. Fessenden et al., Willard Grant Press, 1979, the term aromatic refers to a class of ring compounds that are substantially stabilized by pi-electron delocalization. Such compounds are cyclic, planar, and each atom in the ring has a p orbital perpendicular to the plane of the ring ($Sp^2$-hybrid state). Also, the ring system must have $4n+2$ pi electrons where n is an integer (the Huckel rule). The term heterocyclic (see *The Condensed Chemical Dictionary* 9th Ed., G. G. Hawley, Van Nostrand Reinhold, 1977) denotes a closed-ring structure, usually of either 5 or 6 members, in which one or more of the atoms in the ring is an element other than carbon (eg. sulfur, oxygen, and nitrogen.)

Aromatic compounds in general have ring structures that can be fairly easily polymerized electrochemically in a voltage range suitable for the instant application. The presence of foreign atoms in the ring structure of many aromatic heterocyclic compounds makes the neighboring carbon atoms electron rich and hence the ring structure is easily opened and polymerized at these locations. Other unsaturated ring compounds do not polymerize as easily electrochemically.

Examples of aromatic compounds which form conductive polymers include biphenyl, pyrrole, indole, thiophene, furan, and derivatives thereof. Table 1 (reproduced from *Electrochemistry in Organic Synthesis*, J. Volke & F. Liska, Springer-Verlag, 1994) shows the oxidation potentials of some example monomers versus a standard calomel electrode and the electric conductivity of the polymeric films formed.

TABLE 1

(reproduced from Electrochemistry in Organic Synthesis, J. Volke & F. Liska)

| Compound | Oxidation potential (V vs SCE) | Conductivity (S cm$^{-1}$) |
| --- | --- | --- |
| pyrrole | +0.8 | 30–100 |
| indole | +0.8 | $5 \times 10^{-3}$–$10^{-2}$ |
| thiophene | +0.9 | 10–100 |
| furan | +1.85 | 10–80 |

It should be noted that polymerization potentials depend to some extent on the electrodes and other electrolyte components employed in the electrochemical system. Literature values thus are useful for suggesting potential compound candidates for the instant application, but polymerization may proceed somewhat differently in the actual battery environment. Thus, a compound may be suitable if it polymerizes at voltages above the maximum operating charging voltage of the battery but below the overcharge voltage at which the battery becomes relatively hazardous under actual battery conditions. Note that polymerization must also proceed it a sufficient rate to result in enough polymer to form an adequate bridge by the time it is needed.

The conductivity requirements of the polymerized polymer depend to some extent on the morphology of the polymerized product and on the battery electrochemistry and design. A dense polymeric conductive bridge can be expected to have a lower resistance than a highly fibrous bridge. Batteries having thick separators and/or small electrode areas might require a polymer with greater conductivity than batteries having thin separators and/or large electrode areas since the same net resistance can be obtained with a more resistive polymer and a shorter length, larger cross-sectional area bridge. Finally, the internal resistance needed depends on specific battery voltage, capacity, and state of charge versus relative hazard characteristics.

Generally, for purposes of the invention, the lowest amount of monomer additive is employed to effect the desired internal short. While the additives must be relatively inert in the first place with respect to lithium and to the electrodes (ie. should not be capable of reacting with the lithium or inserting in the electrodes) excessive amounts of even an inert additive may be expected to adversely affect battery performance characteristics (eg. by increasing battery impedance). Typically, for operation of the invention, amounts of the order of a few percent by weight or volume in the electrolyte is sufficient. The actual amount required for enablement will again depend in part on battery electrochemistry and design as well as the monomer characteristics.

Several criteria must therefore be met when choosing additives for a given application. Although the acceptable ranges for meeting these criteria may be relatively broad, some non-inventive empirical trials are required in order to verify the suitability of a particular additive candidate for any given battery application. These trials would be expected to include overcharge testing of trial batteries comprising varied amounts of additive candidate. Either during or after the selecting of an apparently enabling amount of an additive, some performance testing of trial batteries is also required to completely test for adverse effects on performance. Such trials should be well within the scope and capabilities of those skilled in the art, and not require inventive input.

We have found that biphenyl is a particularly preferred additive for use in typical commercial lithium ion battery products for consumer electronics. These batteries typically have thin separators (about 25 micrometers thick) and high surface area electrodes (circa a few hundred square centimeters). Battery capacities of order of 1Ah and up are common. The normal maximum operating charging voltages are about 4.2V. Between this limit and about 5 volts, the batteries become relatively more hazardous. During overcharge at C rate or more, a few percent of biphenyl additive can polymerize sufficiently to form a conductive bridge to discharge the battery to a safe state of charge within 24 hours. As disclosed in Canadian Patent Application Ser. No. 2,156,800, the biphenyl additive appears to polymerize at 4.70 volts vs $Li/Li^+$ in such battery environments and use of a small amount does not adversely affect battery performance significantly. Other potentially suitable additives such as 3-chlorothiophene and furan were also identified therein.

In the Examples to follow, other additives have been identified which might be suitable for use in non-aqueous batteries having lower operating charging voltages (ie. less than 4.2V). These additives include pyrrole, N-methylpyrrole, and thiophene and seem more suitable for lower voltage batteries because internal shorts are formed at too low a voltage in representative example batteries.

It is expected that other additives which are closely related to the preceding (ie. substituted compounds or derivatives thereof) will show similar but slightly modified properties and thus may be a preferred choice for certain applications.

With the exception of the presence of the additive, the construction of batteries of the invention can be conventional. Generally, an enabling amount of additive is simply mixed in with the bulk electrolyte at some preferred point during normal assembly. Minor handling changes may of course be required to account for differences in the properties of the bulk electrolyte and the additive (eg. vapor pressure, toxicity, etc.).

Non-aqueous rechargeable lithium batteries appear in various configurations commercially (ie. prismatic formats or miniature coin cells) and many different components may be used. (For instance, while such additives would likely be less mobile in a polymeric electrolyte, it is conceivable that batteries comprising solid polymer electrolytes might achieve similar benefits by incorporating such additives.) A preferred construction for a lithium ion type product is depicted in the cross-sectional view of a conventional spiral-wound battery in FIG. 1. A jelly roll 4 is created by spirally winding a cathode foil 1, an anode foil 2, and two microporous polyolefin sheets 3 that act as separators.

Cathode foils are prepared by applying a mixture of a suitable powdered (about 10 micron size typically) cathode material, such as a lithiated transition metal oxide, possibly other powdered cathode material if desired, a binder, and a conductive dilutant onto a thin aluminum foil. Typically, the application method first involves dissolving the binder in a suitable liquid carrier. Then, a slurry is prepared using this solution plus the other powdered solid components. The slurry is then coated uniformly onto the substrate foil. Afterwards, the carrier solvent is evaporated away. Often, both sides of the aluminum foil substrate are coated in this manner and subsequently the cathode foil is calendered.

Anode foils are prepared in a like manner except that a powdered (also typically about 10 micron size) carbonaceous insertion compound is used instead of the cathode material and thin copper foil is usually used instead of aluminum. Anode foils are typically slightly wider than the cathode foils in order to ensure that anode foil is always opposite cathode foil.

The jelly roll 4 is inserted into a conventional battery can 10. A header 11 and gasket 12 are used to seal the battery 15. The external surface of the header 11 is used as the positive terminal, while the external surface of the can 10 serves as the negative terminal. Appropriate cathode tab 6 and anode tab 7 connections are made to connect the internal electrodes to the external terminals. Appropriate insulating pieces 8 and 9 may be inserted to prevent the possibility of internal shorting. Prior to crimping the header 11 to the can 10 in order to seal the battery, electrolyte 5 is added to fill the porous spaces in the jelly roll 4. In batteries of the invention, the electrolyte 5 additionally comprises an enabling amount of monomer additive.

The batteries are protected against the electrical abuse of overcharge via one or more acceptable constructions such as: pressure activated internal electrical disconnect devices, positive thermal coefficient devices (PTC), or overcharge protection circuitry. Additional safety devices can be incorporated for other reasons if desired. Usually, a safety vent is incorporated that ruptures if excessive pressure builds up in the battery.

The battery depicted in FIG. 1 is equipped with an internal electrical disconnect device in the header 11 which is similar to that shown in Canadian Patent Application Ser. No. 2,099,657. The disconnect device can be activated by a gassing agent such as $Li_2CO_3$. The gassing agent may, but need not, also serve as a polymerizable additive for creating an internal short (as disclosed in Canadian Patent Application Ser. No. 2,163,187 above). It may instead be preferred to employ a polymerizable additive for creating an internal short which does not generate gas during overcharge and to use alternate means for activating the disconnect device (eg. such as disclosed in Canadian Patent Application Ser. No. 2,093,763 above). Monomer additives that polymerize via the breaking of double bonds may not generate any gaseous by-products and thus could be suitable for such a situation.

The following discussion is provided for purposes of illustration, but should not be construed as limiting in any way. Without being bound by theory, polymerization of the additive is believed to occur at the cathode resulting in the formation of polymer on the cathode surfaces. Additive throughout the electrolyte should continue to migrate towards the cathode and polymerize or, contact therewith resulting in the growth of a deposit which can eventually extend through the separator and contact the anode. Thus, a conductive bridge can be formed. In typical lithium ion batteries, the electrodes are both in close physical contact with a thin, low volume, microporous separator. As such, even a relatively small amount of monomer might be expected to enable a desired internal short.

The following Examples are provided to illustrate certain aspects of the invention but should not be construed as limiting in any way. 18650 size (18 mm diameter, 650 mm height) cylindrical batteries were fabricated as described in the preceding and shown generally in FIG. 1. Cathodes 1 comprised a mixture of $LiCoO_2$ powder, a carbonaceous conductive dilutant, and polyvinylidene fluoride (PVDF) binder uniformly coated on both sides of a thin aluminum foil about 5.4 cm in width by 49.5 cm in length. Coating weight was about 47 mg/cm$^2$. Anodes 2 were made using a mixture of a spherical graphitic powder plus Super S (trademark of Ensagri) carbon black and polyvinylidene fluoride (PVDF) binder (in amounts of about 2% and 10% by weight respectively to that of the spherical graphitic powder) uniformly coated on thin copper foil of similar length to the cathode but 3 mm greater in width. Coating weight was about 23 mg/cm$^2$. Microporous polyolefin film was used to form the separators 3. The electrolyte 5 was a solution of a lithium salt dissolved in a solvent mixture of ethylene carbonate (EC), propylene carbonate (PC), and diethyl carbonate (DEC) in a EC/PC/DEC volume ratio of 30/20/50. Approximately 5 cc of electrolyte was used in each battery.

Example I

Two 18650 batteries were assembled as described above using a 1.5 M $LiBF_4$ electrolyte solution except that the first comparative battery contained no additive while the second inventive battery comprised 2% by weight biphenyl additive in the electrolyte. (Biphenyl is a solid at room temperature and thus; is conveniently quantified by weight rather than by volume.) These batteries were also equipped with a pressure relief vent and internal electrical disconnect device as described in the aforementioned Canadian Patent Application Ser. No. 2,099,657. The batteries were initially conditioned at 21° C. by charging, discharging, and then charging again to the normal maximum operating voltage of 4.1 volts.

Both batteries were then subjected to overcharge abuse at a background temperature of 21° C. using a current supply with 10 volt compliance. The batteries were partially overcharged at 3 and 3.6 amps respectively for 12 minutes (a time sufficient to significantly raise the battery state of charge without activating the internal electrical disconnect). The voltage of the batteries was then monitored for about 19 hours. The voltage of the first was stable over this period at about 4.5 volts. The voltage of the second dropped continously to about 4.05 volts by the end of this period. Each battery was then subjected to nail penetration abuse which results in a hard internal short. The first comparative battery vented explosively with flame. The second inventive battery did not vent or burn.

This example shows that the battery comprising biphenyl additive, even though originally overcharged slightly more than the comparative battery, discharged itself sufficiently to be markedly safer on subsequent mechanical abuse.

Example II a) Ten 18650 batteries were assembled and conditioned as in Example I except that a 1 M $LiPF_6$ electrolyte solution comprising 2.5% by weight biphenyl additive was employed. These batteries were overcharged at 21° C. at 3.6 amps until the internal electrical disconnect device was activated. (The biphenyl additionally served as a gassing agent in this example to activate the disconnect device as described in the aforementioned Canadian Patent Application Ser. No. 2,163,187). The batteries were stored for 24 hours and then were subjected to nail penetration abuse. No battery vented or burned. The maximum skin temperature recorded on the batteries during nail penetration abuse was 33° C.

b) Three 18650 batteries were assembled and conditioned as in a) above except that no additive and no internal electrical disconnect device was employed. Instead, these batteries were equipped with PTC devices in the header to limit the charging current thereby protecting the battery during overcharge abuse. These batteries were overcharged at 21° C. at 3.6 amps until the PTC activated (ie. the PTC heated up sufficiently to increase suddenly and markedly in resistance). The batteries did not vent or burn. The batteries were next stored in an open circuit condition for 24 hours and then were subjected to nail penetration abuse. One of the three batteries vented violently with flame.

c) Six 18650 batteries were assembled and conditioned as above except that a 1.5 M $LiBF_4$ electrolyte solution was employed without any additive. The batteries were constructed such that the internal electrical disconnect devices were hydraulically activated by the net increase in internal solids volume at a specified state of overcharge as described in Canadian Patent Application Ser. No. 2,093,763 above. These batteries were overcharged at 21° C. at 3.6 amps until the internal electrical disconnect devices activated. The batteries did not vent or burn. The batteries were next stored for 24 hours and then were subjected to nail penetration abuse. Five of the six batteries vented violently with flame.

This example shows that within 24 hours after overcharging, disconnect equipped batteries comprising the additive were markedly safer to subsequent mechanical abuse than comparative batteries equipped with either disconnects or PTCs, but comprising no additive.

Example III

Figure 2:
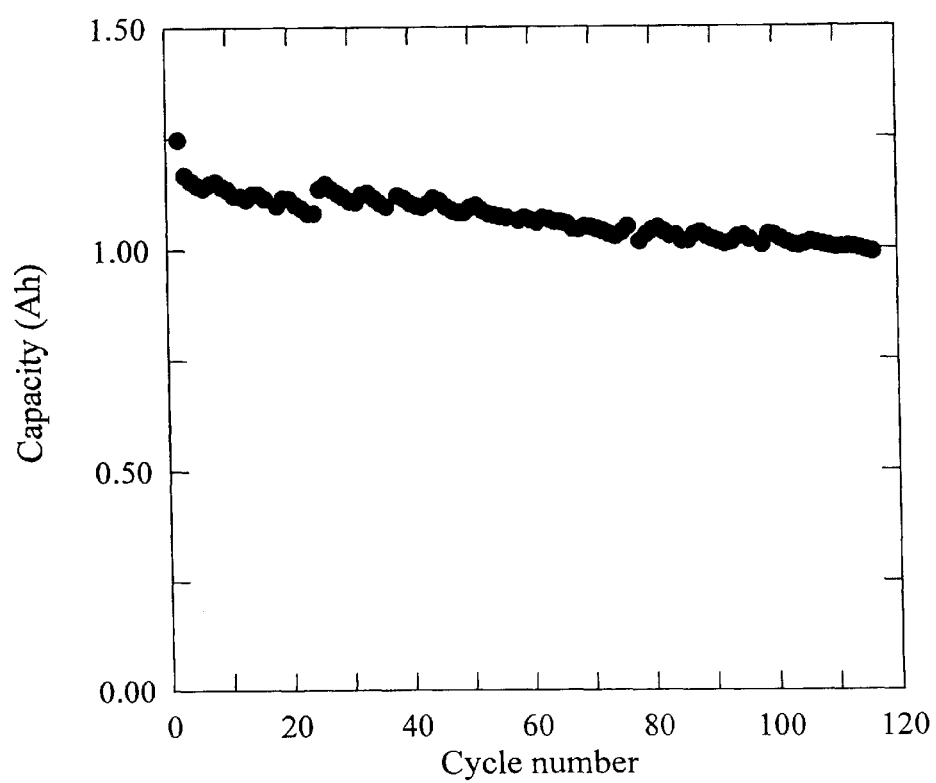
FIG. 2 shows the capacity versus cycle number data for the battery in Example III.

A 18650 size battery was assembled as described in Example I except that the electrolyte comprised 5% by weight biphenyl additive. The battery was then charged to 4.1 volts and stored at 60° C. for one week. Thereafter, the battery was cycled at 21° C. using a constant 1 amp current discharge to 2.5 volts and a current limited, constant voltage charge to 4.1 volts. Every 20 cycles, a series of discharge currents with decreasing magnitude was applied in a stepwise fashion to determine if any capacity loss was recovered at a lower discharge rate. FIG. 2 shows the capacity versus cycle life data for this battery.

This example shows that excellent cycling results can still be obtained even with the presence of up to 5% by weight biphenyl additive.

Example IV

A series of 18650 batteries was made similar to those of Example I in order to screen potential candidates from a performance perspective. In this series, batteries comprising the following additives (% by volume) were made and electrically conditioned: 0.5% pyrrole, 0.42% N-methylpyrrole, and 1% thiophene. Batteries comprising pyrrole additive developed such a significant internal short during conditioning that they could not be fully charged, implying, that the internal short carried more than the 60mA charging current. The onset of shorting began circa 3.5 V and the battery voltage did not exceed about 3.7 V. Batteries comprising the N-methylpyrrole additive were charged to 4.1 V and were monitored at open circuit thereafter. The voltage dropped significantly, to about 3.9 V in 24 hours. An internal short appears to have developed above about 3.5 V. A battery comprising the thiophene additive was charged to 4.2 V and was noted to drop to 4.09 V after one hour at open circuit.

While these additives appear unsuitable for use in the high voltage battery embodiments of the previous Examples (because internal shorts develop in the normal operating voltage range), they nonetheless may be suitable additives for non-aqueous batteries with lower operating charging voltages.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A non-aqueous rechargeable lithium battery having a lithium insertion compound cathode; a lithium compound anode; a non-aqueous electrolyte; and a maximum operating charging voltage; wherein the improvement comprises a monomer additive mixed in said electrolyte, said monomer additive polymerizing to form an electrically conductive polymer at battery voltages greater than the maximum operating charging voltage, in combination with a battery configuration designed so that said polymer creates an internal short circuit in the battery during overcharge abuse independent of any other overcharge protection means.

2. A non-aqueous rechargeable lithium battery as claimed in claim 1 wherein the battery additionally comprises overcharge protection means to protect the battery against overcharge abuse wherein the maximum operating charging voltage of the battery is exceeded.

3. A non-aqueous rechargeable lithium battery as claimed in claim 2 wherein the overcharge protection means comprises a positive temperature coefficient resistor which increases in resistance during overcharge abuse thereby limiting charging current.

4. A non-aqueous rechargeable lithium battery as claimed in claim 2 wherein the overcharge protection means comprises an internal electrical disconnect device, said disconnect device activating at a predetermined internal pressure; and a gassing agent other than the monomer additive, said gassing agent generating gas and pressure activating the disconnect device during overcharge abuse.

5. A non-aqueous rechargeable lithium battery as claimed in claim 4 wherein the gassing agent is $Li_2CO_3$.

6. A non-aqueous rechargeable lithium battery as claimed in claim 2 wherein the overcharge protection means comprises electrical circuit means to limit charging current or voltage.

7. A non-aqueous rechargeable lithium battery as claimed in claim 1 wherein the mixture of electrolyte and monomer additive comprises less than about 5% monomer additive by weight.

8. A non-aqueous rechargeable lithium battery as claimed in claim 1 wherein the monomer additive is aromatic.

9. A non-aqueous rechargeable lithium battery as claimed in claim 8 wherein the aromatic additive is biphenyl.

10. A non-aqueous rechargeable lithium battery as claimed in claim 9 wherein the mixture of electrolyte and aromatic additive comprises about 2 to 3% biphenyl additive by weight.

11. A non-aqueous rechargeable lithium battery as claimed in claim 8 wherein the aromatic additive is selected from the group consisting of pyrrole, N-methylpyrrole, thiophene, furan, indole and 3-chlorothiophene.

12. A non-aqueous rechargeable lithium battery as claimed in claim 8 wherein the aromatic additive is pyrrole, N-methylpyrrole or thiophene.

13. A non-aqueous rechargeable lithium battery as claimed in claim 8 wherein the aromatic additive is furan, indole, or 3-chlorothiophene.

14. A non-aqueous rechargeable lithium battery as claimed in claim 1 wherein the maximum operating charging voltage is greater than 4 volts.

15. A non-aqueous rechargeable lithium battery as claimed in claim 1 wherein the lithium insertion compound cathode is $Li_xCoO_2$, $Li_xNiO_2$, or $Li_xMn_2O_4$.

16. A non-aqueous rechargeable lithium battery as claimed in claim 1 wherein the lithium compound anode is a carbonaceous compound.

17. A non-aqueous rechargeable lithium battery as claimed in claim 1 wherein the electrolyte solvent comprises an organic carbonate selected from the group consisting of ethylene carbonate, propylene carbonate, diethyl carbonate, and ethyl methyl carbonate.

18. A non-aqueous rechargeable lithium battery as claimed in claim 1 wherein the electrolyte solute comprises $LiPF_6$ or $LiBF_4$.

19. A method for rendering an overcharged non-aqueous rechargeable lithium battery safe to further abuse, the battery having a lithium insertion compound cathode; a lithium compound anode; a non-aqueous electrolyte; and a maximum operating charging voltage; which comprises:

(a) selecting a monomer additive that polymerizes to form an electrically conductive polymer at battery voltages greater than the maximum operating charging voltage; and (b) mixing an amount of the monomer additive in said electrolyte wherein the amount is sufficient in combination with the battery configuration such that an internal short circuit is created by the polymerized additive during overcharge abuse thereby discharging the battery to a safe state of charge independent of any other overcharge protection means.

20. A method as claimed in claim 19 wherein the mixture of electrolyte and monomer additive comprises less than about 5% monomer additive by weight.

21. A method as claimed in claim 19 wherein the mixture of electrolyte and monomer additive comprises sufficient monomer additive to create an internal short circuit capable of discharging the battery to a safe state of charge within 24 hours.

22. A method as claimed in claim 19 wherein the monomer additive is aromatic.

23. A method as claimed in claim 22 wherein the aromatic additive is biphenyl.

24. A method as claimed in claim 23 wherein the mixture of electrolyte and aromatic additive comprises about 2 to 3% biphenyl additive by weight.

25. A method as claimed in claim 22 wherein the aromatic additive is selected from the group consisting of pyrrole, N-methylpyrrole, thiophene, furan, indole and 3-chlorothiophene.

26. A method as claimed in claim 22 wherein the aromatic additive is pyrrole, N-methylpyrrole or thiophene.

27. A method as claimed in claim 22 wherein the aromatic additive is furan, indole, or 3-chlorothiophene.

28. A method as claimed in claim 19 wherein the maximum operating charging voltage is greater than 4 volts.

* * * * *